(12) United States Patent
Peterson

(10) Patent No.: US 7,190,862 B1
(45) Date of Patent: Mar. 13, 2007

(54) METHODS AND APPARATUS FOR OPTICAL SWITCHING USING ELECTRICALLY MOVABLE OPTICAL FIBERS

(75) Inventor: Kenneth A. Peterson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/197,153

(22) Filed: Aug. 3, 2005

(51) Int. Cl.
*G02B 6/35* (2006.01)
*H01L 21/00* (2006.01)

(52) U.S. Cl. .............................. 385/41; 385/16; 438/27
(58) Field of Classification Search .................... None
See application file for complete search history.

(56) References Cited

U.S. PATENT DOCUMENTS

| | | | |
|---|---|---|---|
| 3,470,320 | A | 9/1969 | Pike et al. |
| 4,236,784 | A | 12/1980 | Palmer |
| 5,214,727 | A | 5/1993 | Carr et al. |
| 5,715,337 | A | 2/1998 | Spitzer et al. |
| 5,727,098 | A | 3/1998 | Jacobson |
| 6,381,382 | B2 * | 4/2002 | Goodman et al. ............ 385/22 |
| 6,577,785 | B1 | 6/2003 | Spahn et al. |
| 2004/0062510 | A1 | 4/2004 | Romo et al. |
| 2004/0223717 | A1 | 11/2004 | Romo et al. |
| 2004/0223718 | A1 | 11/2004 | Romo et al. |
| 2004/0264847 | A1 | 12/2004 | Koh et al. |

OTHER PUBLICATIONS

Richard R.A Syms et al, "Optical MEMS for Telecons", Richard R.A Syms et al, Materials Today, Jul./Aug. 2002, vol. 5, No. 7-8, pp. 26-35.
Martin Hoffman et al, "Bulk Silicon Micromachining for MEMS in Optical Communication Systems", Journal of Micromechanics and Microengineering; Jul. 2002, vol. 12, No. 4, pp. 349-360.

* cited by examiner

*Primary Examiner*—Michelle Connelly-Cushwa
*Assistant Examiner*—Jerry T Rahll
(74) *Attorney, Agent, or Firm*—Birch, Stewart, Kolasch, and Birch, LLP; William R. Conley

(57) ABSTRACT

Methods and apparatuses for electrically controlled optical switches are presented. An electrically controlled optical switch includes a fixture formed using a laminated dielectric material, a first optical fiber having a fixed segment supported by the fixture and a movable segment extending into a cavity, a second optical fiber having a fixed segment supported by the fixture and an extended segment where an optical interconnect may be established between the first optical fiber and the second optical fiber, and a first electrical actuator functionally coupled to the fixture and the first fiber which alters a position of the moveable segment, based upon a control signal, for changing a state of the optical interconnect between one of two states.

5 Claims, 11 Drawing Sheets

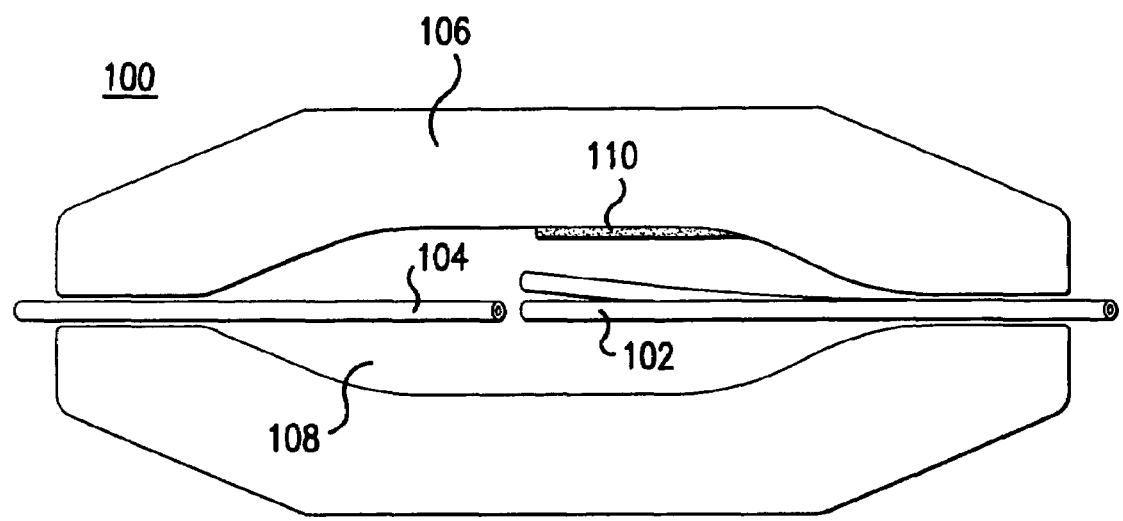
FIG.1A
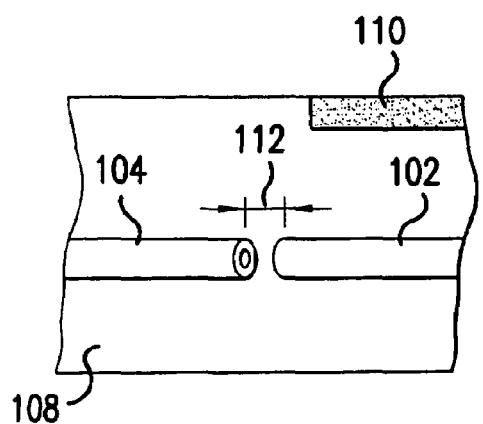 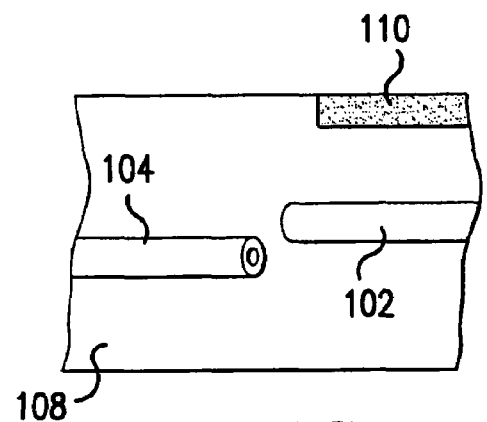
FIG.1B  FIG.1C

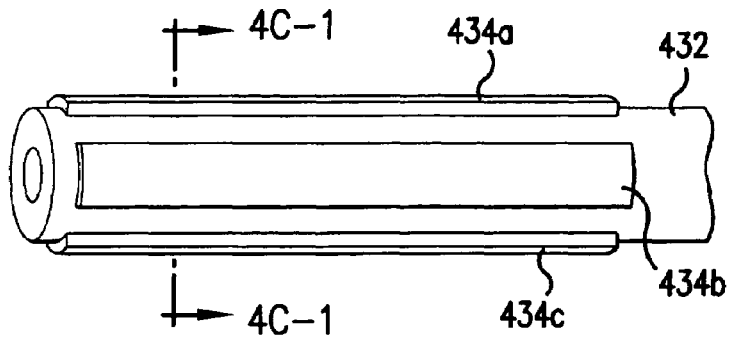 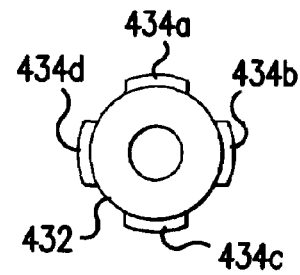
FIG.4C  FIG.4C-1
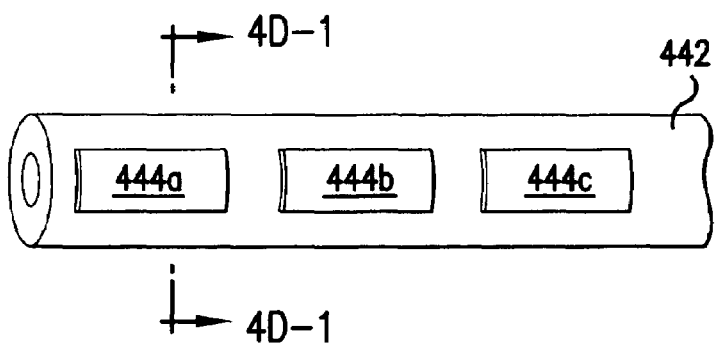 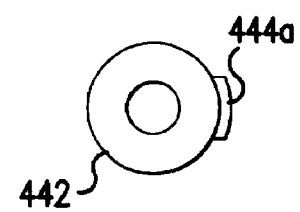
FIG.4D  FIG.4D-1
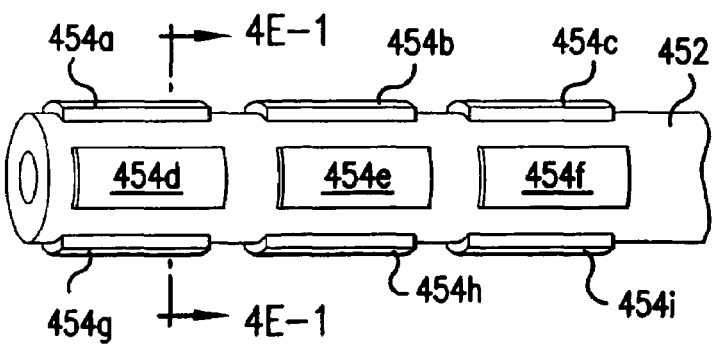 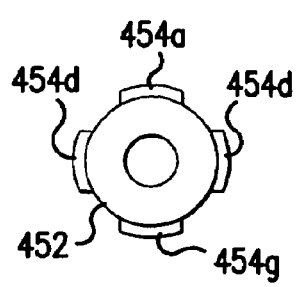
FIG.4E  FIG.4E-1

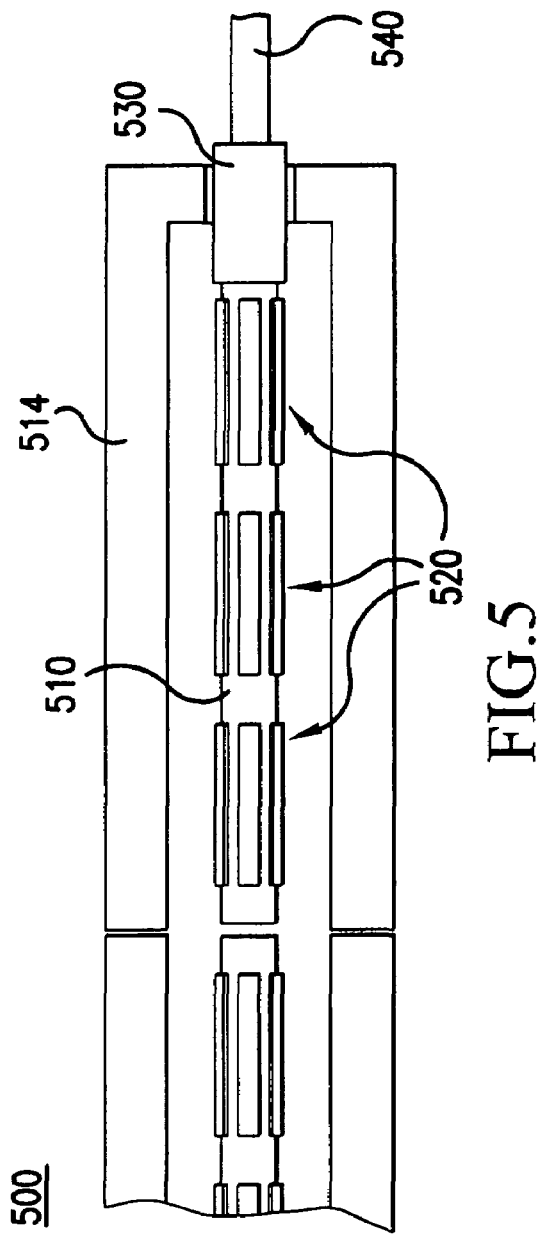
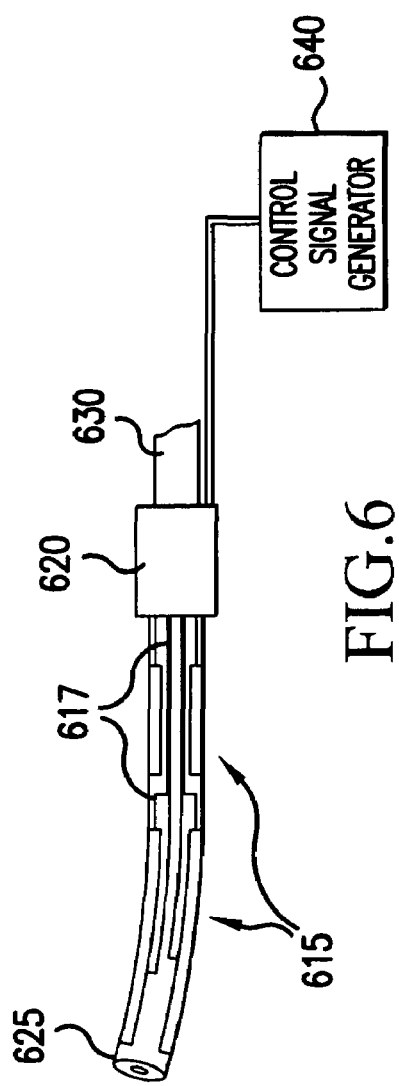

METHODS AND APPARATUS FOR OPTICAL SWITCHING USING ELECTRICALLY MOVABLE OPTICAL FIBERS

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

Embodiments of the present invention generally relate to optical switches and optical switching arrays, and more specifically, the application of electrically movable optical fibers for performing optical switching tasks.

BACKGROUND OF THE INVENTION

The increasing demand for improved optical networking communications can motivate advancements in network switching technology. Many conventional optical switching techniques may first convert the optical signal to an electronic format, and then may switch the electronic signal using conventional electronic switching circuits. After the switching function is performed, the electronic signal may then be converted back into and optical format. In order to reduce complexity, cost, and improve performance, it may be desirable to utilize optical switches which can directly perform switching entirely within the optical domain without involving such conversions.

Conventional optical switches may be realized by attaching the optical fiber to a macroscopic switchable mechanism. In one area of endeavor, macro-switching devices may be utilized to perform direct optical switching. These devices may attach additional elements to switching waveguides (such as, for example, optical fibers) to effect switching. These additional elements can potentially impact miniaturization and operating characteristics of the switching devices.

Optical switches may also be realized by using Micro Electro-Mechanical System (MEMS) techniques. Some MEMS optical switches may use micro-mirror arrays to redirect light received from optical fibers to perform switching. While the micro-mirror array may consist of tiny mirrors having sizes down in the micrometer scale, the configuration of the micro-mirror array may utilize large comb drives and other infrastructure which may substantially increase the overall complexity and size of the device. Additionally, because MEMS micro-mirror arrays typically utilize switching through free space using at least one optical reflection, minimization of overall device size may be an issue, and physical attributes, such as pop-up and alignment angles, may have to be calibrated using tight tolerances which can concern some regarding yield and reliability. Such complexities of MEMS micro-mirror arrays could potentially affect the reliability of the overall switching device and may increase the cost of device fabrication. Moreover, to facilitate mirror movement for signal switching, MEMS micro-mirrors may typically be thin, which can limit the amount of signal power that can be switched without altering the performance or damaging the device.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1A shows a longitudinal cutaway view of an embodiment consistent with the invention having one movable optical fiber;

FIGS. 1B–C enlarge the area between the two adjacent optical fibers shown in FIG. 1A to depict exemplary states of the optical switch;

FIG. 4C shows an exemplary optical fiber having four attached electrodes continuous in the longitudinal direction;

FIG. 4D shows an exemplary optical fiber having three attached electrodes segmented in the longitudinal direction;

FIG. 4E shows an exemplary optical fiber having a plurality of electrodes segmented in both the longitudinal and circumferential directions of the fiber;

FIG. 5 shows a longitudinal cross-section of another embodiment consistent with the invention having a moveable optical fiber with segmented electrodes coupled to a ferrule;

FIG. 6 shows an exemplary shape of an optical fiber which may be obtained using segmented electrodes;

DETAILED DESCRIPTION OF THE INVENTION

Figure 2A:
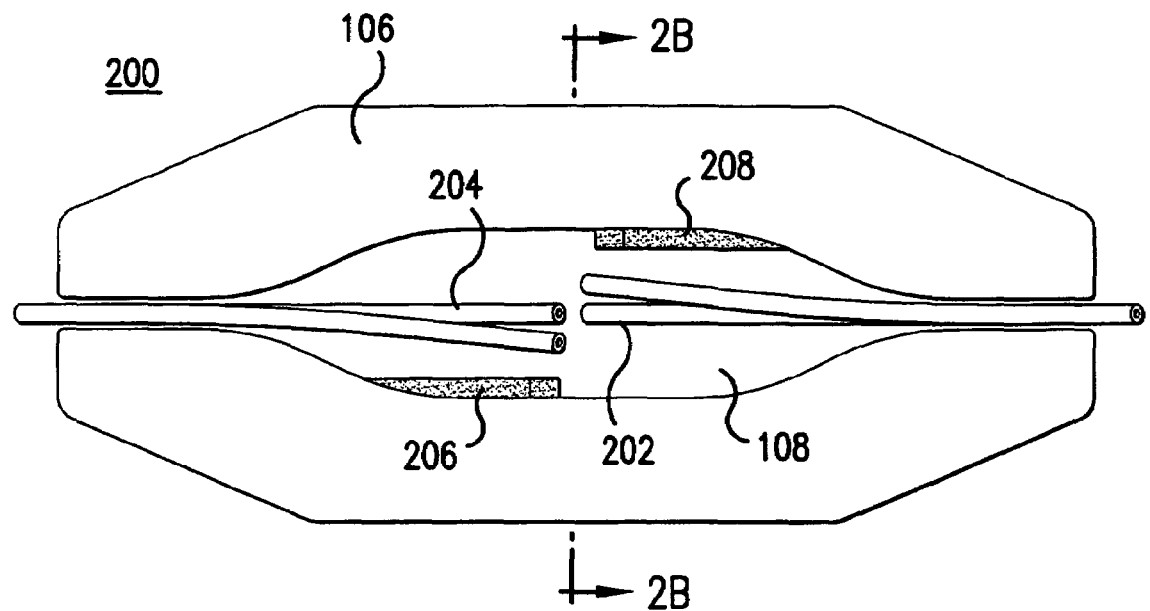
FIG. 2A depicts a longitudinal cross-section of another embodiment consistent with the invention having two movable optical fibers.

The following detailed description of the embodiments of the invention refers to the accompanying drawings. The same reference numbers in different drawings identify the same or similar elements. Also, the following detailed description does not limit the invention. Instead, the scope of the invention is defined by the appended claims and equivalents thereof.

Various embodiments of the invention may be directed to switches for directing one or more optical signals under the control of one or more electrical control signals. These embodiments may be realized using Micro-Optical Electromechanical Systems (MOEMS) technology, which may further include electrostatic actuators which steer optical fibers, in one or more dimensions, under the direction of control signals. The steering may cause a direct movement of the fiber for directing an optical signal directly into another fiber, or for steering the fiber in a manner which directs the optical signal into free space. As used herein, an optical signal may be generated by a laser, generated by any means known in the art, or any other type of light energy which may be used for optical communications. Moreover, optical fibers as described herein may be waveguides allowing the transmission of optical signals, and may include single mode or multi-modal optical fibers, which may be similar to optical fibers known in the art and possibly modified, as described herein, for operation consistent with embodiments of the invention. Additionally, some embodiments of the invention may realize MOEMS optical switches and/or other optical devices which modify the characteristics of an optical signal, such as, for example, an optical attenuator.

FIG. 1A shows a longitudinal cross-section of an embodiment of an optical switch 100. Optical switch 100 may include movable optical fiber 102, fixed optical fiber 104, cavity 108, fixture 106, and electrode 110. A portion of fixed optical fiber 104 may be supported by fixture 106, while another portion may extend into cavity 108 in a cantilever type fashion. Moveable optical fiber 102 may also have a portion supported by fixture 106, while a moveable portion extends into cavity 108. The amount of extension of fixed optical fiber 104 may vary depending upon the application of optical switch 100; however, at least the tip of the fiber may be fully extended into the cavity. For example, the extension for fixed optical fiber 104 may be less than 1.5 inches. The moveable portion should extend into the cavity an amount which allows for sufficient movement which may depend upon a variety of factors, including the application of the device. For example, like fixed optical fiber 104, moveable optical fiber 102 extension into cavity 108 may be less than or equal to 1.5 inches. Electrode 110 may be attached to fixture 106 and may be placed adjacent to moveable fiber 102. When an electric potential is applied between electrode 110 and moveable fiber 102, electrostatic attraction can exert a force on moveable fiber 102 and may cause it to move toward electrode 110. Alternatively, other embodiments may utilize electrostatic repulsion to cause moveable fiber 102 to move away from electrode 110 when the appropriate electric potential is applied. In effect, an electrical actuator can be formed by establishing an electrical circuit which may include electrode 110 and moveable fiber 102. For the embodiment shown in FIG. 1A, when no voltage is applied, fixed fiber 104 and movable fiber 102 may be arranged so that they form an effective optical interconnect at the junction between the two fibers for allowing an optical signal to pass therethrough, thus placing optical switch 100 in an "on" state. Once a control signal is applied to the electric actuator, movable fiber 102 may be steered toward electrode 110 to the extent where the optical interconnect can be severed, thus placing optical switch 100 in an "off" state. Moreover, one of ordinary skill in the art would appreciate that either movable fiber 102 or fixed fiber 104 may act as an input (for providing the optical signal into cavity 108) or an output (for directing the optical signal out of cavity 108) for optical switch 100. Input and output signals may be carried by additional optical fibers which could attach to each of the exposed ends of the fixed segments, external of the cavity, of movable fiber 102 and fixed fiber 104, using any method of attaching fiber known in the art. Fixture 106 may be fabricated from a wide variety of different materials, including metals, polymers, composites, ceramics, etc. As discussed in more detail below, various embodiments may machine fixture 106 from a solid stock of metal; other embodiments may feature using metal plates to realize fixture 106. Still other various embodiments may use ceramic, polymers, and/or other composite materials to form fixture 106 with cavity 110, such as, for example, using low-temperature co-fired ceramics (LTCC), high temperature co-fired ceramics, printed circuit board techniques, or any other laminated dielectric processes known in the art.

FIGS. 1B–1C depicts an enlarged view of the area containing the optical interconnect between movable fiber 102 and fixed fiber 104 for the embodiment shown in FIG. 1A. FIG. 1B shows optical switch 100 having an optical interconnect state being "on." In this case, the centers of the tips of each optical fiber align so that a substantial amount of energy is transferred from one optical fiber to another across a gap 112. Gap 112 may be small enough so that the attenuation of the optical signal passing through the optical interconnect is negligible. For some embodiments, including the one pictured in FIG. 1A, the gap length may be on the order of several microns or less. In other embodiments, the gap may vary depending upon architecture of the optical switch. Additionally, in order to maximize the transfer of optical signal from one fiber to the other, FIG. 1B shows the opposing fibers directly facing each other with the axis of each fiber being substantially collinear. However, other arrangements of fibers having varying geometries, such as, for example, wherein the axes of each fiber may not be collinear, may be contemplated by other various embodiments of the invention. FIG. 1C shows optical switch 100 having the optical interconnect being in the "off" state after a control signal is applied to the electric actuator. Here, the tips of the fibers are misaligned in such a manner that substantial amounts of the optical signal are not transferred between movable optical fiber 102 and fixed optical fiber 104, but may be instead directed into cavity 108. In other embodiments, light may be dumped into a designated device and/or area, outside the cavity, etc., so that the dumped light may not affect other components inside the device. In this embodiment, having the optical interconnect the "on" state may be considered the default state because it occurs when no control signal is applied to the actuator; however, one of ordinary skill in the art would appreciate that other embodiments having different fiber configurations may have a default optical interconnect state being in the "off" state.

FIG. 2A depicts a longitudinal cross-section of another embodiment consistent with the invention having two moveable optical fibers. An optical switch 200 may include a first moveable optical fiber 202, a second movable optical fiber 204, a first electrode 208, a second electrode 206, a cavity 108, and a fixture 106. A first electrical actuator can be formed by establishing an electrical circuit which may include first electrode 208 and first moveable fiber 202. A second electrical actuator may be formed by establishing an electrical circuit which may include second fiber 204 and second electrode 206. Control signals may be applied to each of the first actuator and the second actuator to move the first fiber toward the first electrode, and the second fiber toward the second electrode. This movement may misalign the axes of moveable optical fiber 202 and movable optical fiber 204, thus preventing the optical interconnect from allowing an optical signal to pass, and placing switch 200 in an "off" state. The control signals may be the same signal, or they may be different signals, for example, to suit the individual characteristics of the respective movable fiber. In the absence of an applied control signal, moveable fiber 202 and movable fiber 204 are substantially collinear, thus placing the optical interconnect in an "on" state. For the embodiment shown in FIG. 2A, first electrode 208 and second electrode 206 may be placed on the opposite sides of the cavity to optimize the displacement between the movable fibers. As in the embodiment shown in FIG. 1A, the electrodes may be attached directly to fixture 206, or may be indirectly affixed through an insulator.

Further referring to FIG. 2A, by having two optical fibers moving in opposite directions to affect the switching action of optical switch 200, any one fiber may not have to bend as great a distance as in the embodiment shown in FIG. 1A, where only one optical fiber moves. This may allow a reduction of fiber length, which could change the switching speed of the fiber, or alter a resonance frequency of the fiber, which may be useful if an optical switch is used in an application which subjects it to external vibration. Moreover, for long fiber lengths, the angle between the two fibers which is induced by bending may be less consequential; however, an angle between two fibers may limit the transfer of the signal, for example, in terms of amplitude attenuation and/or bandwidth. Therefore, there may be some benefit to keeping the axes of the fibers collinear, and thus the faces of the tips of the fibers in a parallel configuration.

Figure 2B:
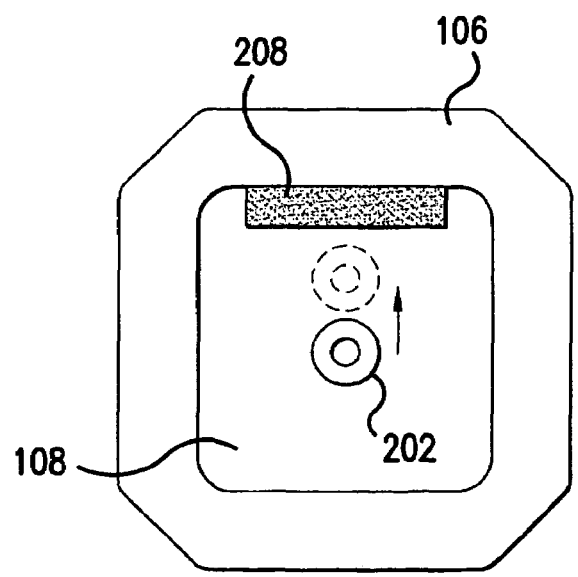
FIG. 2B shows a transverse cross-section along line 2B—2B of the embodiment shown in FIG. 2A.

FIG. 2B shows a transverse cross-section along line 2B—2B of the embodiment shown in FIG. 2A. FIG. 2B depicts the vertical movement of moveable fiber 202 toward electrode 208 upon the application of a control signal. The control signal may induce an electrostatic potential difference between electrode 208 and movable fiber 202, which generates an electrostatic attractive force. The amount of movement may be dictated by a number of variables depending upon the application of optical switch 200. For example, if the fibers within optical switch 200 are large core multi-modal fibers, the distance required to place the optical interconnect in the "off" state may increase. A model which may be used to assist in the design of an optical switch may be mathematically presented as follows:

$$l = \frac{b\varepsilon V^2 L^4}{2EId^3}$$

where:
l: normalized load (force)
b: width of electrode
ε: the dielectric permittivity;
V: the applied voltage
L: length of extended portion of movable fiber;
E: Young's Modulus;

I: moment of inertia (pi*r to the fourth power/4); and
d: separation distance between the movable fiber and an electrode.

This equation can give the normalized load required to provide a normalized deflection at the tip of a moveable fiber (which may be mechanically thought of as a cantilever beam). As used herein, the normalized deflection is the deflection divided by the separation distance d. This mathematical equation may model a planar cantilever type device. An approximation may be established by projecting the area of the round fiber onto the electrode. A more exact solution may be obtained by integrating electrode segments according to their exact properties (e.g., separation).

Parameters which may be of interest may be determined by the properties of the fiber, primarily the core diameter. It can be presumed that a switch would have to effect a total displacement of one core diameter between fiber tips to be in the off condition. Having the displacement parameter defined based in-part upon the fiber's core diameter, other parameters may then be considered. The distance to the electrode should be large enough to permit complete switching as mentioned above without being so large that it requires an excessively long fiber length and/or high voltage. To merely switch a signal off, the fiber could be permitted to snap down to the electrode (preferably physically, but not electrically) as occurs at a threshold voltage. This would put the gap at a dimension just larger than required to effect complete on or off switching. Some applications will call for the avoidance of snap-down, requiring a significantly larger gap. In the snapped down condition, the fiber tip is the first to touch a physical stop, followed by some length of fiber for a long fiber. The fiber can be shortened to a length that effects complete switching for a given application. In addition, by making the gap no larger than required, more force can be generated at a smaller distance, permitting lower actuation voltages. The material properties of the fiber, whether it is glass (fused silica), plastic, or any other material known to one of ordinary skill in the art and its coatings may play a role through the elastic properties expressed in the modulus of elasticity (Young's modulus, E). A stiffer fiber typically requires additional force compared to a more compliant fiber, and this force may have to be generated by adjusting the other parameters of this equation. Increasing the diameter of the fiber can be seen to stiffen the fiber geometrically, also requiring more force for deflection. Either doubling the length of the fiber or halving the diameter of the fiber can require a load 1/16 as large as the original fiber, as the moment of inertia, I, involves a radius to the fourth power. Reducing the separation distance d by a factor of 2 can change the force required for a given deflection by a factor of 8. The model represented by the above equations has been used repeatedly to determine the benefit of a particular design. Some fibers may only be required to move a short distance (simple switch). Others may be required to move greater distances, which may be beneficial for scalability in order to reach more combinations of opposing fibers (such as in, for example, optical switching arrays).

In order to design an optical switch, one may initially consider the core diameter required for the switching application. This in turn may affect the amount of deflection desired to change the state of the optical interconnection in a desired manner. Knowing the desired deflection, one may then choose the various parameters to effect movement. For example, a designer could choose using a higher voltage over a short distance with a short fiber, or may wish to employ a lower voltage over a longer distance.

Further referring to FIG. 2B, the control signal applied to the first electric actuator may be any type electrical signal known to those skilled in the art. The signal may vary depending upon a variety of parameters, such as, for example, the distance movable fiber 202 should be pulled, the length of the fiber, the switching speed desired, the electrical and/or mechanical properties of the fiber, etc. Moreover, in other embodiments having different fiber configurations or in optical fiber arrays, the type of control signal(s) used may vary accordingly. The control signals may take any known structural form, such as, for example, sine waves, square waves, etc. The voltage amplitudes of the control signals should be large enough to generate an electrostatic force to move the fiber, and may require voltages in the tens to hundreds of volts. For typical configurations, the voltage amplitudes may be approximately 60 volts. Various embodiments also contemplate using the control signal not only to move the fiber, but also control the fiber's dynamics. Taking, for example, the switch shown in FIG. 2A, in order to change the state of the optical interconnect from 'off' to "on," the control signals to the first and second actuators could simple be switched off. However, this could create undesirable oscillations and/or overshoots in movable fibers 202 and 204. Instead of simply turning the control signal off, one could vary the signal to bring the fibers into their rest positions in a controlled manner, thus mitigating oscillations, overshoots, and/or other dynamic behavior. As another example, the structure of the control signal may be chosen to maximize the switch speed of moveable fibers 202 and 204.

One of ordinary skill in the art would appreciate that the invention may be applied in a wide variety of switching applications. In some of these applications, the speed at which movable optical fibers 202 and 204 switch may be of considerable interest. However, in other applications, there may be less concern regarding the switching speed, and a greater interest in simply reconfiguring an optical switch. For example, satellite applications may benefit from optical fiber arrays which could reconfigure a mode of operation, or be used to switch in a redundant system in the event of, for example, a subsystem failure, using remote control.

The optical fiber which may be used in optical switch 200 may be based in part upon optical fibers known in the art. The optical fibers may be multi-mode or single mode fibers. The fibers may have a fused silica core which is used to conduct the optical signal and a fused silica cladding for providing insulation and support. The multimode fibers may have core diameter of about 100 microns, and single mode fibers may have core diameters of approximately 9 microns. Typically multi-mode fiber and single mode fibers may have approximately the same outer diameters of about 125 micron diameters, which includes the cladding. The core and cladding can be polymers, or other waveguides embedded in a fixture, such as, for example, a fixture fabricated from LTCC. Moreover, optical fibers typically may have a buffer, which can be polymer based, to provide further mechanical support, and a plastic sheath, which may provide an outer protective coating. In order to effectively exert an electrostatic force on the fiber, the fiber may have some conductive component associated therewith to distribute a voltage potential on its surface. This conductive component may not need to handle high electric currents, because in normal operation no current should flow from the electrode through the moveable optical fiber. For various embodiments, the moveable optical fibers can be coated with a metallic material to provide this conductive component. The metallic coating can be applied using any known techniques which do not comprise the integrity of the fiber, including, for example, evaporative processes, sputtering processes, etc. The metallic material could be a single conductive metal, such as gold or titanium, or could also be a combination of coatings using different metallic materials applied in a layered manner to achieve specific effects. For example, a fiber may first be coated with titanium for adhesion to the outside of the cladding and a second layer of gold maybe coated over the titanium. In other instances, depending upon, for example, the characteristics of the fiber and/or the application of the switch, only a single coating of titanium may be used. For example, a gold coating may be used given it provides opportunity for subsequent processing in air at elevated temperatures associated with the LTCC process (approximately 850° Celsius). The fibers may be manufactured with a metal coating at the time the core and clad are extruded or commercially coated with metal such as Ti/Ni/Au sequential layers for a different purpose, such as soldering a hermetic seal.

In one experiment, standard commercial optical fibers (ThorLabs single mode fiber SMF 28-J9 and multi-mode fiber AFS 105/125Y) were modified to create a suitable movable optical fiber which could be used in an optical switch. The ThorLabs commercial fiber was initially "connectorized" on each end and then severed at the approximate midpoint. The severed ends served as the tips for forming an optical interconnect between the severed fibers. A portion of the fiber was then stripped by removing the plastic sheath and polymer buffer from approximately the last two inches from the tip, thus taking the fiber down to its silica components. The stripped fiber was then placed in a coating machine to coat the entire circumference of the stripped portion of the fiber with a metal material. In this instance, an evaporator machine, which was earlier customized to coat rods, accomplished the coating process. The fiber was initially coated with a titanium layer, and subsequently coated with a gold layer on top of the titanium layer. Each fiber was then 'cleaved' at its tip, using a commercial cleaving apparatus, to render the face of the tips suitable for transmitting an optical signal.

Various embodiments of the invention can also use an altered formulation of the fiber's buffer so that it would have conductive properties suitable for use as a moveable optical fiber. As with a metal, a conductive polymer could enable the fiber to distribute a voltage potential on its surface, so that it would be subject to electrostatic forces when a control signal is applied to the electric actuator. These conductive buffers may be applied by an optical fiber manufacturer, thus possibly obviating the step of coating the fiber with a metal layer. Additional embodiments can include coating a conductor over the buffer, or coating portions of the protective sheath that may cover the buffer, however this may add weight to the completed movable fiber which could affect its dynamic properties.

Figure 3A:
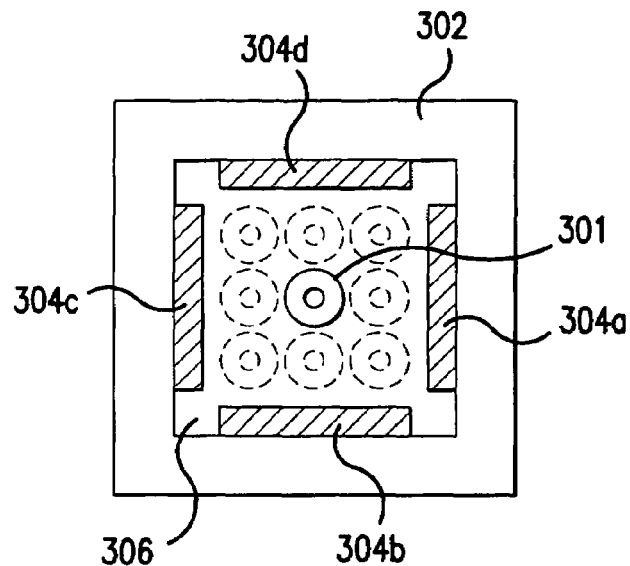
FIG. 3A shows a transverse cross-section of another embodiment consistent with the invention having a square fixture and cavity with four electrodes.

FIG. 3A shows a transverse cross-section of another embodiment consistent with the invention. This embodiment includes fixture 302, moveable optical fiber 301, cavity 306, and electrodes 304a–d. Fixture 302 and cavity 306 can have a substantially square cross section as shown. Of course, alternate embodiments could include cavity 306 having a square cross-section and fixture 302 having different cross-sectional shapes. Four fixed electrodes 304a–d within cavity 306 may be coupled to the interior of fixture 302 on each side of the square interior. One of ordinary skill in the art would appreciate that the number of electrodes shown in FIG. 3A need not be fixed at four, and could be any practicable number greater than or equal to one. With the four-electrode arrangement, the tip of movable optical fiber 301 may be bent in such a manner so it may move substantially in two-dimensions within cavity 306. The fixed electrodes can be directly deposited on the wall or can be composite electrodes that are subsequently attached to the wall. Examples of the latter could be conductors on an electrically insulative substrate, such as, for example, a ceramic plate and/or a plastic film. The electrode may extend beyond the cavity a sufficient distance to facilitate interconnections among optical fibers. In the case of a plastic film, the film could be rolled and inserted into the cavity, resulting in proper placement of the electrodes around the fiber in a radial manner. In the case of a ceramic substrate, the layers can be inserted into the cavity in the proper orientation. Fixed electrodes have been etched for many different applications in copper on Kapton™ (i.e. polyimide) film. The continuation of the fixed electrode outside the cavity can assist interconnection as it can be easily manipulated to a convenient position. The conductor on the ceramic can be deposited using thick film, thin film, dispensed, sprayed, or extruded polymer loaded with conductive particles, or any other technique known in the art.

The fixed electrodes themselves may be comprised of any conductive material which can distribute an electrical potential on their surface, such as, for example copper on Kapton polymer film, thick film metal on a ceramic substrate that has been fired, thin film metal that has been deposited on a ceramic substrate, electroless or a combination of electroless/electrolytic plating of a metal on an insulator, etc. Some materials, such as electroless coatings, may be used because of their relative ease of application to fibers, buffered fibers, and cavities. An electrophoretic deposition technique for deposition of a conductive polymer may also be used. Attaching the fixed electrodes to a fixture may depend upon the fixture's specific material and the fixed electrode. For example, in LTCC or High Temperature Co-fired Ceramic (HTCC), the metal conductor may be an integral part of the process. When a ceramic or polymer base is used for an electrode, an adhesive can attach the electrode in the proper position (using, for example, epoxy, solder, etc). Moreover, the fixed electrodes may be segmented in the axial dimension of the moveable fiber (not shown) or may be segmented in about the circumference of the moveable optical fiber, as shown for electrodes 304a–d in FIGS. 3A and 314a–c in FIG. 3B.

Figure 3B:
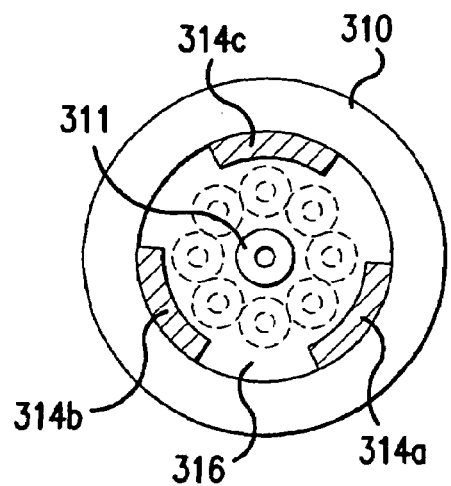
FIG. 3B shows a transverse cross-section of another embodiment consistent with the invention having a circular fixture and cavity with three electrodes.

FIG. 3B shows a transverse cross-section of another embodiment consistent with the invention. This embodiment includes fixture 310, moveable optical fiber 311, cavity 316, and electrodes 314a–c. Fixture 310 and cavity 316 can have a substantially circular cross section as shown. Of course, alternate embodiments could include only cavity 316 having a substantially circular cross section. Three fixed electrodes 304a–d within cavity 316 may be coupled to the interior of fixture 310. However, other embodiments may feature a different number of electrodes which could be any practicable number greater than or equal to one. As with this four-electrode arrangement shown in FIG. 3A, movable optical fiber 311 may be bent in such a manner so it may move in two-dimensions within cavity 316. However, unlike the embodiment shown in FIG. 3A, the circular arrangement of electrodes 314a–c can be form fitting around fiber 311. This configuration can result in a distance between the electrodes 314a–c and moveable optical fiber 311 which varies minimally along the projected circumference of the fiber. Using form-fitting electrodes 314a–c, the effective projected surface area of moveable fiber 311 onto each electrode can be greater than that for planar electrode configurations shown in FIG. 3A. The form-fitting configurations may result in a stronger attractive force exerted on the fiber which may be desirable for a variety of reasons, such as, for example, the electrical efficiency of the switch.

Figure 4A:
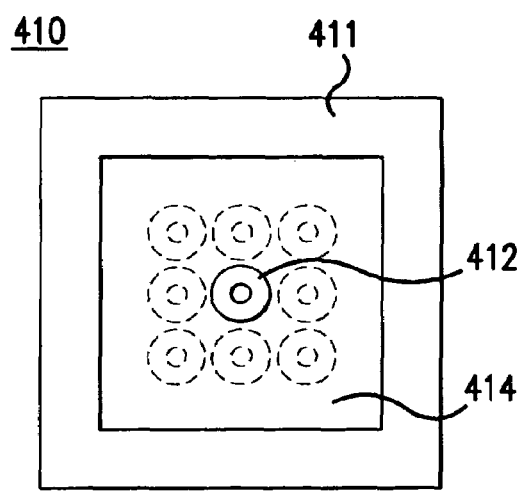
FIG. 4A shows a transverse cross-section of another embodiment consistent with the invention having a square fixture and cavity without discrete, multiple electrodes.

FIG. 4A shows a transverse cross-section of an optical switch having a fixture acting as a single electrode which is consistent with another embodiment of the invention. Optical switch 410 may have a square fixture 411 and/or a square cavity 414. In this embodiment, there are no discrete electrodes attached to the interior of fixture 411 as shown in the previous embodiments above. Fixture 411 may be fabricated using a conductive material so that it, in effect, may act like a single electrode. Fixture 411 may be machined from a metallic material, be formed using a conductive polymer, or any other appropriate materials known to a skilled artisan. Other embodiments could contemplate having fixture 411 being fabricated from a non-conductive material, such as, for example, ceramic, and having an interior coated with a conductive substance. This conductive substance could be, for example, a polymer and/or a metallic material. Fixture 411, or some integral part thereof, may therefore act as a common electrode, and therefore kept at a common reference voltage potential (which in various embodiments may be tied to ground). By utilizing fixture 411 in this manner, the fabrication of the block may be simplified, and portions of the electric actuator which have the greatest amount of exterior exposure can be kept at common potential as a safety measure. By having appropriate electrodes on moveable fiber 412, the fiber tip may be moved in substantially two-dimensions within cavity 414 by applying appropriate control signals to electrodes physically attached to fiber 412.

Figure 4B:
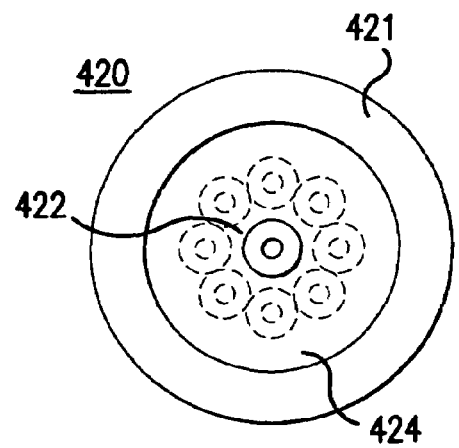
FIG. 4B shows a transverse cross-section of another embodiment consistent with the invention having a circular fixture and cavity without discrete, multiple electrodes.

FIG. 4B shows a transverse cross-section of another embodiment consistent with the invention. Optical switch 420 may have a circular fixture 421 and/or a circular cavity 424. As with the embodiment shown in FIG. 4A, there may be no discrete electrodes attached to the interior of fixture 421. Fixture 421 may also be made from a conductive material and act as a single electrode. However, using a circular structure may provide a fixture which better fits the exterior form of moveable optical fiber 422. This can maximize the effective surface area of moveable optical fiber 422 projected onto fixture 421, thus allowing for a greater electrostatic force for a given voltage. Fixture 421 may be machined from a metallic material, be formed using conductive bulk polymer stock, or using any other appropriate materials and fabrication methods known to a skilled artisan. Other embodiments could contemplate having fixture 421 being fabricated from a non-conductive material, such as, for example, ceramic, and having an interior coated with a conductive substance. This conductive substance could be, for example, a polymer and/or a metallic material. Fixture 421, or some integral part thereof, may act as a common electrode, and thus may be referenced as having common voltage potential. As in fixture 411 described above, utilizing fixture 421 in this manner may simplify its fabrication and provide an optical switch where exterior portions of the electric actuator can be kept at common potential as a safety measure. By having appropriate electrodes on moveable fiber 422, the fiber tip may be moved in substantially two-dimensions within cavity 424 by applying appropriate control signals to the fiber-attached electrodes.

FIG. 4C shows an exemplary optical fiber consistent with the embodiments shown in FIGS. 4A and 4B having segmented electrodes. Moveable optical fiber 432 may have four attached electrodes 434a–d which are segmented in the circumferential direction of fiber 432 and continuous in the longitudinal direction. One of ordinary skill in the art would appreciate that moveable fiber 432 may have one or more electrodes and is not limited to four. Control signals may be individually applied to each electrode 434a–d to affect movement of moveable optical fiber 432 in the desired direction. Applying a control signal to a specific electrode on moveable optical fiber 432 may cause it to move in the direction of the conductive fixture at a different potential along the shortest path. For example, applying a control signal to electrode 434a would cause it to move upward toward the top of the fixture. Electrodes 434a–d may be applied to fiber 432 in a variety of ways. One manner may utilize a coating process which coats the electrodes directly on moveable fiber 432. Because electrodes 434a–d may not be required to conduct an appreciable amount of current, they may be thin in the radial dimension. Alternatively, electrodes 434a–d could be applied by "writing" or spraying a material on moveable fiber 432a–d. Other application techniques, which may be employed in the MEMS or silicon fabrication arts, may also be used, which could include masking, sputtering and/or evaporative processes. By way of example only, a conductive coating could initially be applied to the fiber, and portions of the conductive coating could be scraped off to form the electrodes upon the moveable optical fiber.

FIG. 4D shows another exemplary optical fiber consistent with the embodiments shown in FIGS. 4A and 4B having segmented electrodes. For this embodiment, moveable optical fiber 442 may have three attached electrodes 444a–c which are segmented in the longitudinal direction of moveable optical fiber 442. Control signals may be applied to each of electrodes 444a–c in order to move the fiber in the direction of the shortest path to the fixture (i.e., in this example, move optical fiber 442 to the right in FIGS. 4D-1). In one configuration, the same control signals could be applied to effect movement of moveable optical fiber 442. In other configurations, different signals could be applied to each electrode 444a–c to not only move the fiber, but to also provide the ability to shape the fiber in various ways. For example, by applying stronger control voltages to electrodes toward the tip of the moveable optical fiber, portions of the fiber may be moved with different forces, thus causing a bend and/or a curl in the fiber. This embodiment is more fully discussed below in FIGS. 6, 7A and 7B.

Alternatively, the segmented electrodes may be configured so that they may work individually or in sub-groups to move the fiber. In this manner, the multiple electrodes may provide redundancy so that moveable optical fiber 442 will still operate in the event one or more electrodes malfunction. In this configuration, during normal operation control signals would only be applied to one or a subset of electrodes 444a–c. In the event of a malfunction of an electrode 444a,b, or c, the control signal(s) may be routed to different electrodes to affect switching without having to replace the optical switch.

FIG. 4E shows yet another exemplary optical fiber consistent with the embodiments shown in FIGS. 4A and 4B having segmented electrodes. In this example, moveable optical fiber 452 has a plurality of electrodes 454a–i segmented in both the longitudinal and circumferential directions of the fiber. Different control signals may be applied to bend and/or shape the fiber in a manner not possible with unsegmented electrodes. Also, further segmentation may also provide additional reliability by providing the possibility of greater redundancy. The electrodes 454a–i may be formed on moveable optical fiber 452 in the same manner as described above for the embodiment shown in FIG. 4C.

FIG. 5 shows a longitudinal cross-section of an exemplary optical switch 500 having a fiber with segmented electrodes. Fixture 514 may be made from a conductive substance and kept at common potential (e.g., ground voltage). Moveable optical fiber 510 may have electrodes 520 which can be segmented in both the longitudinal and circumferential direction as described above. Fiber 510 may be physically coupled to fixture 510 using ferrule 530. Ferrule 530 may be fabricated from a non-conductive material to prevent an electrical short-circuit between any conducting components on fiber 510 and the grounded fixture 514. External optic fiber 540 may attach to ferrule 530 to either feed optical signals into optical switch 500 and/or pass optical signals from optical switch 500. Ferrule 530 may be fabricated from any non-conductive materials known in the art, such as, for example, plastic and/or ceramic. For moveable optic fiber 510 having segmented electrodes 520, ferrule 530 may be configured with the appropriate connectors to complete the circuit(s) between the on-fiber electrodes 520 and the rest of the electric actuator circuit. Ferrule 530 may be placed around the sheath of moveable optical fiber 510, where the cantilevered portion thereof may have the sheath removed to reduce the weight of the dynamic portion of the fiber. Ferrule 530 may then be attached to moveable optical fiber using any means known in the art, such as, for example, a mechanical slip or snap fit, conductive epoxy, etc. Placement of ferule 530 may also provide an initial, or rough, centering to assist in the alignment of moveable optical fiber 510. Afterwards, any misalignments may be accounted for by fine-tuning the each of the control signals to segmented electrodes 520. The individual control signals may be, for example, biased in such a manner as to pull a fiber into the appropriate direction to correct mechanical misalignments using electrostatic forces.

One of ordinary skill in the art would appreciate that ferrules may also be used with various embodiments of the invention having moveable optical fibers not having segmented electrodes. In these cases, when the fiber is associated with a single conductive material, such as, for example, a metallic coating or conductive polymer, a non-conductive ferrule may also be used to prevent short-circuits between the fiber and electrodes affixed to the fixture. In this case, the ferrule may be simpler than the embodiment described above wherein it may not have to accommodate more complex connections from a plurality of segmented electrodes. However, the ferrule may have some circuitry in order to provide an electrical path to complete the actuator circuit for the moveable optic fiber. Another embodiment may contemplate a conductive ferrule which may provide contacts to portions of the fixture which are grounded, thus grounding the movable optical fiber. Of course, in this embodiment, the fixed electrodes which may be attached to the fixture would have to be properly insulated from grounded portions of the fixture in order to prevent short circuits. In other embodiments, the entire fixture may be non-conductive using materials, such as, for example, LTCC. In this case, it may not matter if the ferrule is conductive or non-conductive because the fixture itself would not provide an electrical path for a short circuit.

In previous experimental work, an insulating ferrule was attached to a metallic back plate using an adhesive glue. The plate had leveling screws in order to mechanically align a moveable optical fiber. The moveable optical fiber was glued into the ferrule, which was clamped into a block acting as a fixture.

FIG. 6 shows an exemplary shape of an optical fiber which may be obtained using segmented electrodes. In this embodiment, optical fiber 625 may have electrodes 615 segmented in the longitudinal and circumferential directions. By applying appropriate control signals to selected electrodes, the shape of moveable optical fiber may be altered in ways not obtainable with a single electrode fiber. For example, moveable optical fiber 625 may be placed into shapes having curvature as shown, for example, in FIG. 6. The individual control signals may be applied by control signal generator 640, through ferrule 620, and along to the appropriate electrodes using selected signal lines from the group of signal lines 617. Signal lines 617 may be applied to moveable optical fiber 625 using the same techniques as described above for the segmented electrodes.

Figure 7A:
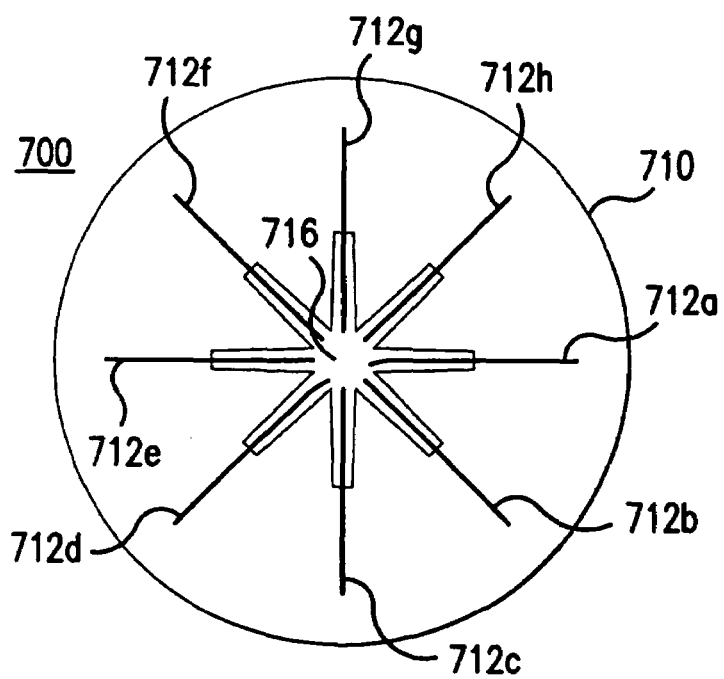
FIG. 7A shows an embodiment consistent with the invention having a circular array configuration which utilizes fibers having segmented electrodes.
Figure 7B:
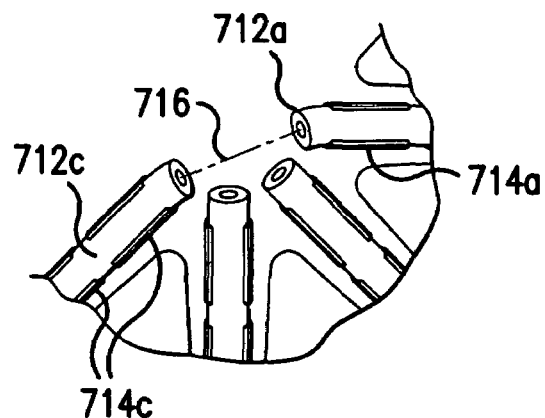
FIG. 7B shows an enlarged view of the cavity corresponding to the embodiment shown in FIG. 7A.

FIGS. 7A and 7B show an embodiment consistent with the invention having a multi-fiber configuration utilizing fibers having segmented electrodes. An exemplary 2-D circular optical switching array 700 is depicted having the ability to switch an optical signal through multiple switch paths. Here, eight moveable optical fibers 712a–h may be arranged around a circular pattern, each being set in fixture 710. The tips of the moveable optical fibers 712a–h may extend into a common cavity 716 where, when in a relaxed state, opposing fibers pairs (712a, 712e), (712b, 712f), (712c, 712g) and (712d,712h) may be coaxially aligned or intentionally misaligned. In order for any one fiber to connect a non-opposing fiber with adequate optical coupling, the participating fibers are moved and shaped to provide an optimal connection. The shaping of the participating fibers is accomplished using segmented electrodes affixed to the moveable optical fibers. For example, as shown in FIG. 7A, moveable optical fibers 712a and 712d are moved and shaped using a sharper curl than that which would have been attained with a movable optical fiber without segmented electrodes. FIG. 7B shows an expanded view of the optical coupling for the embodiment shown in 7A. By applying the appropriate voltages to the segmented electrodes 714c on moveable optical fiber 712c, and appropriate voltages to the segmented electrodes 714a on moveable optical fiber 712a, a direct optical connection may be established.

Figure 8:
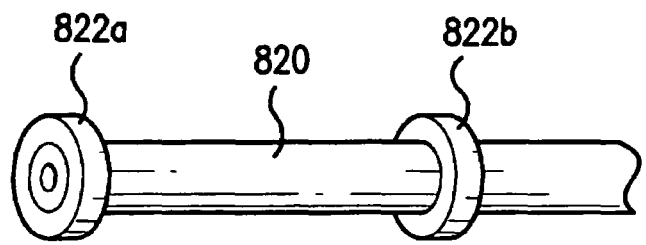
FIG. 8 shows an exemplary variation of a moveable optical fiber consistent with various embodiments of the present invention.

FIG. 8 shows a variation of an exemplary moveable optical fiber consistent with various embodiments of the invention. Moveable optical fiber 820, which may have a conductive component as described above, may additionally have a non-conductive structure associated with it to protect it from direct physical contact with the electrode. These non-conductive structures may take the form of one or more bumpers 822a–b. A bumper may be made out of a polymer-based material and attached to fiber 820 using, for example, adhesive, or using any other methods known in the art. Alternatively, bumper 822a–b may be cut from sheath material which may already be attached to fiber 820 by the manufacturer. Alternatively, nonconductive bumpers can be a feature of the cavity wall.

When a moveable optical fiber comes into contact with an electrode, the phenomena may be referred to as "snap-down." Snap-down may be harmful to the electrode and/or the moveable optical fiber because the physical contact may result in a substantial amount of current flow which in turn can produce enough heat to cause damage. Snap-down may occur when the voltage between the electrode and the moveable optical fiber exceeds a threshold, and in doing so the fiber may be pulled with significant force towards the electrode. As the gap decreases between the fiber and the electrode, the force increases non-linearly. Initially, the tip of the fiber may touch the electrode, and this contact will continue down the length of the cantilevered portion of the fiber until a point is reached where the resistive spring force of the fiber is sufficient enough to prevent that portion of the fiber from coming in contact with the electrode. Bumpers 822a–b may prevent direct physical contact between the moveable optical fiber and the electrode, and thus prevent any large current flow which could damage the fiber and/or electrode. Alternatively, bumpers may be placed on the cavity wall in order to prevent electrical contact when a fiber is above its threshold voltage or in a snap down condition.

Figure 9A:
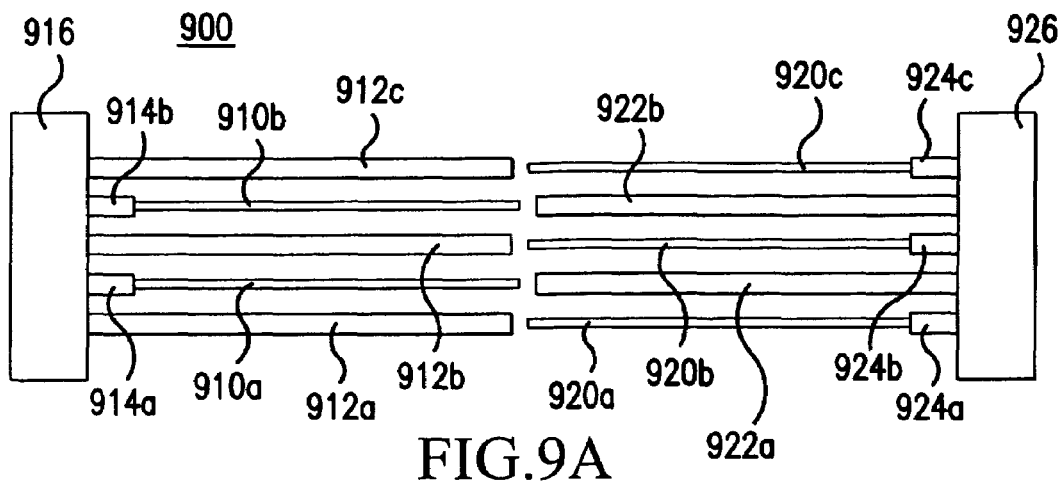
FIGS. 9A and 9B show an exemplary optical fiber array consistent with another embodiment of the invention.
Figure 9B:
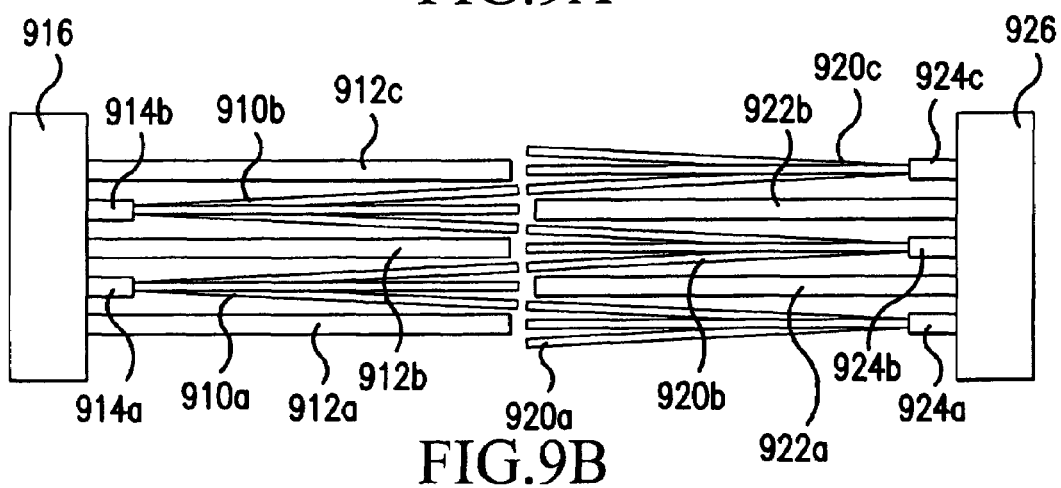

FIGS. 9A and 9B show an exemplary fiber optic array consistent with another embodiment of the invention. FIG. 9A depicts a one-dimensional optical switching array 900 having a first set of moveable fibers 910a–b and a second set of moveable fibers 920a–c. These fibers may be opposed to each other, and when in the relaxed state may not be optically coupled. Moveable optical fibers 920a–c may be coupled into fixture 926 through connectors 924a–c. The connectors may be, for example, ferrules, or any other connector known in the art. Moveable optical fiber 920a may be controlled by electrode 922a. Fiber 920b may be controlled by electrode 922a and 922b. Moveable optical fiber 920c may be controlled by electrode 922b. Moveable optical fibers 910a–b may be physically coupled to fixture 916 through connectors 914a–b. The connectors may be, for example, ferrules, or any other fitting known in the art. Moveable optical fiber 910a may be controlled by either electrode 912a and/or 912b. Moveable optical fiber 910b may be controlled by electrode 912b and 912c.

FIG. 9B depicts each optical interconnect that may be made with optical switching array 900. For example, moveable optical fiber 910b could form optical interconnects with ether moveable optical fiber 920c or 920b. Moveable optical fiber 910a could form optical interconnects with moveable optical fibers 920a or 920b. Each of these interconnects may be formed by applying the appropriate control signals to the corresponding electrodes.

Figure 10:
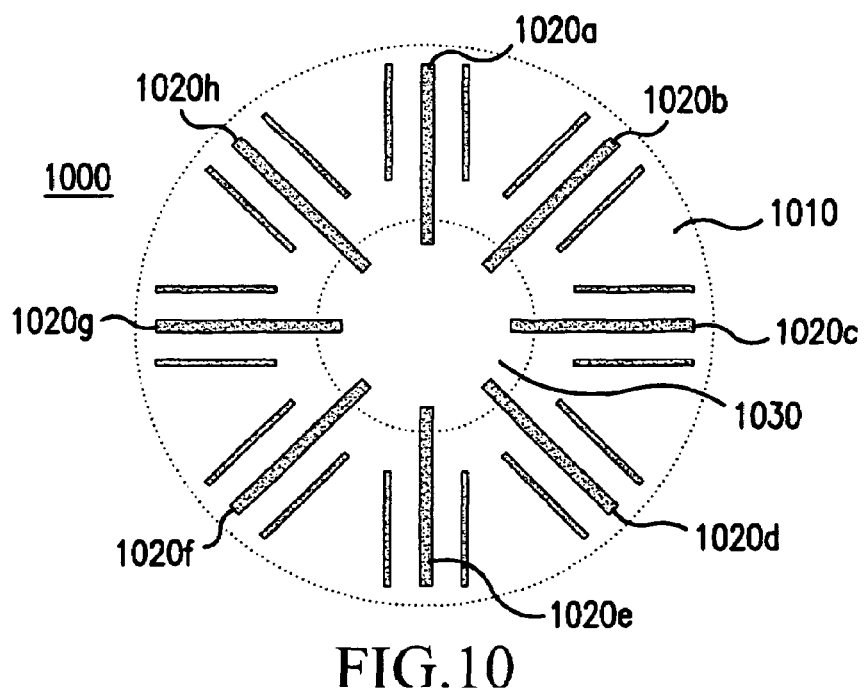
FIG. 10 shows an exemplary optical switching array having a spherical 3-D switching configuration consistent with another embodiment of the invention.

FIG. 10 shows a cross section of an exemplary optical switching array consistent with another embodiment of the invention. Optical switching array 1000 may be a three-dimensional array having a fixture 1010 with a spherical shape. Moveable optical fibers 1020a–h may be placed at points in three-dimensions around the spherical fixture 1010. The moveable optical fibers 1020a–h may form optical interconnects with opposing fibers through spherical cavity 1030. Spherical fixture 1010 may be machined from bulk polymer stock, or metal, or any other material which may be fabricated into a spherical shape that is known in the art. Moreover, spherical fixture 1010 may also be formed using laminate materials, such as, for example, printed circuit board materials, LTCC, HTCC, etc.

Figure 11A:
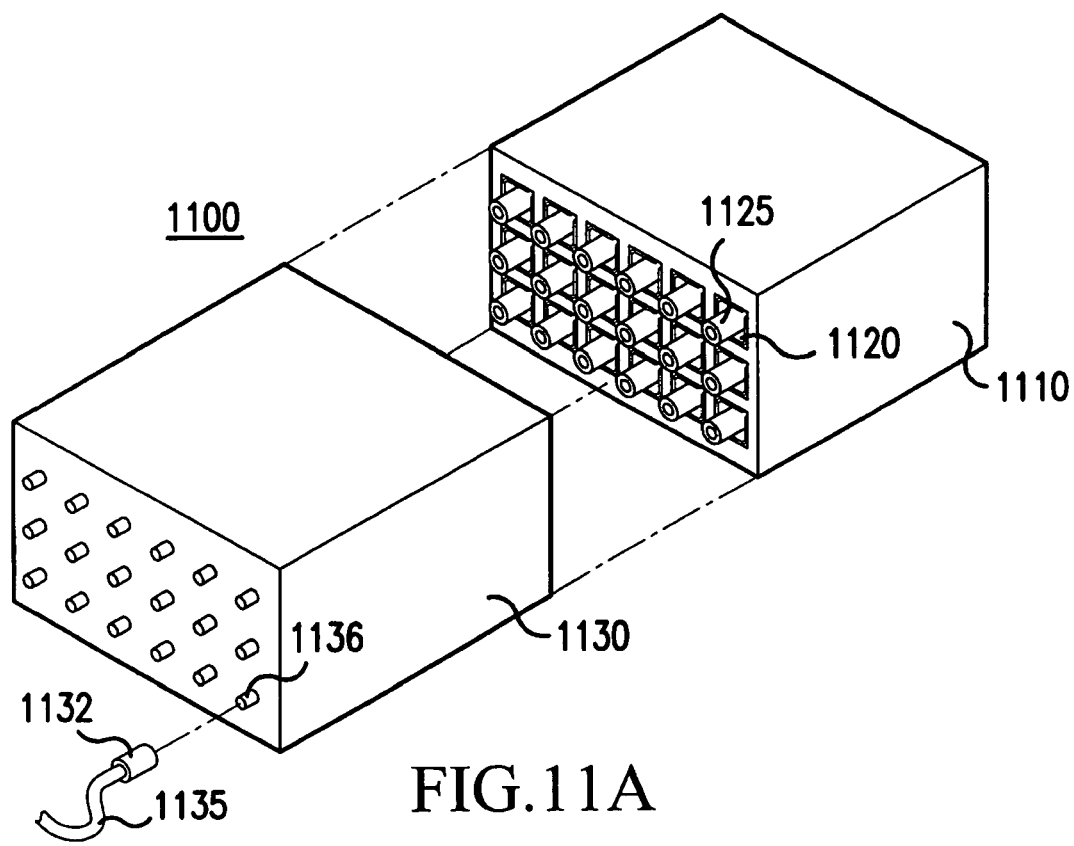
FIGS. 11A and 11B show an exemplary optical switching array having a rectilinear 3-D switching configuration consistent with another embodiment of the invention.
Figure 11B:
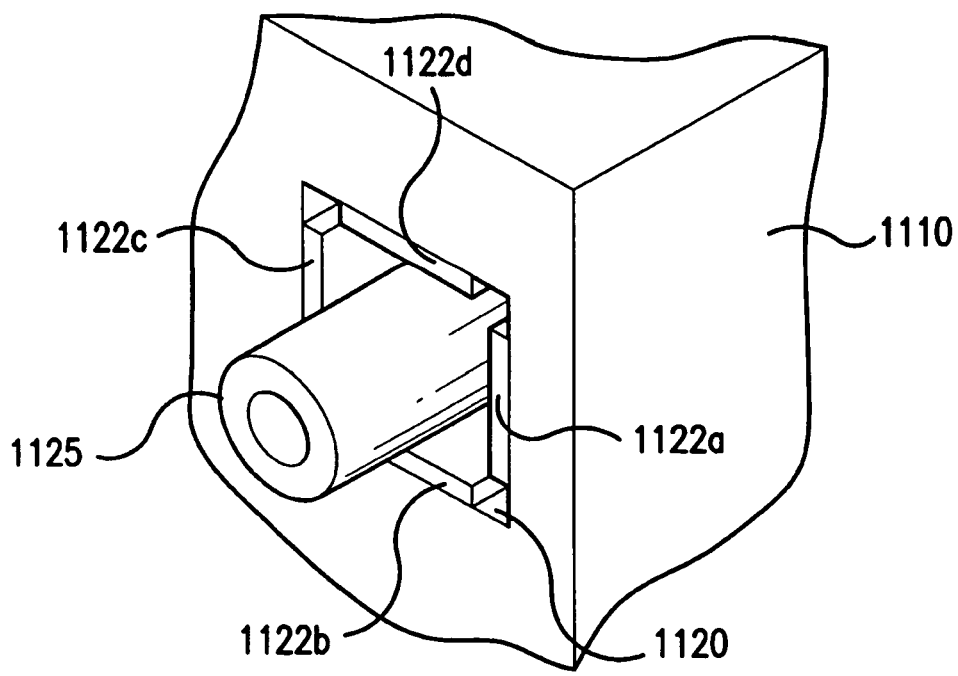

FIGS. 11A and 11B show a rectilinear two-dimensional optical switching array consistent with another embodiment of the invention. Optical switching array 1100 includes two fixtures 1110 and 1130, which are depicted as being separated in FIG. 11A. Both fixtures 1110 and 1130 may include a plurality of cavities 1120 and moveable optical fibers 1125 (not shown in fixture 1130). During the operation of optical switching array 1100, fixtures 1110 and 1130 may be brought into close proximity to facilitate optical coupling of the movable optical fibers from each fixture. Fixtures 1110 and 1130 may be held together using a coupling fixture (not shown) or may be formed on a common substrate where each fixture 1110 and 1130 may be realized as two raised volumes formed into the substrate (not shown). Fixtures 1110 and 1130 may be fabricated by using any methods known in the art, including, for example, machining metals and/or polymers, and/or fabricating using ceramic technologies, including, for example, LTCC techniques. Cavities 1125 may be closely spaced together in a regular matrix pattern as shown, or may be arranged in a checkerboard pattern where cavities are located at alternate positions with each successive row and column. Each cavity may contain a moveable optical fiber 1125 which may extend beyond the surface of the fixture accommodating the cavities 1120. The extension of moveable optical fibers 1125 allows optical interconnects to be established between neighboring moveable fibers located in the opposing fixture. By using this configuration, a single moveable optical fiber may form a plurality of optical interconnects, for example, in some embodiments, a fiber may have interconnect capability to nine or more neighboring moveable optical fibers in the opposing fixture. Both fixtures 1110 and 1130 may include a surface having integral connectors 1136 to allow for the passage of input and output optical signals into optical switching array 1100. Each integral connector 1136 may connect to an external fiber 1135 through attached connector 1132. Moreover, additional connectors may be provided to accept control signals for independently controlling each of the plurality of fibers 1125 (not shown).

FIG. 11B shows a detailed view of one of cavities 1120. Each cavity 1120 may include one or more electrodes to affect movement of moveable optical fiber 1125. Four electrodes, 1122*a–d*, are depicted in FIG. 11B surrounding moveable optical fiber 1125, which extends past the surface of fixture 1110. The electrodes 1122*a–d* may not extend to the end of the cavity 1120 opening, and may be arranged to limit their length in order to prevent the tip of moveable optical fiber 1125 from contacting the electrode and causing a snap-down condition. As described above, the extension of moveable optical fiber 1125 may facilitate optical interconnections with neighboring fibers in opposing fixture 1130. The length of the extension may depend upon the density of cavities 1120 and their spatial configuration; however, typical extensions may be approximately 0.25 inches. The moveable optical fiber 1125 may be associated with a conductive material, as described above, such as, for example, a metallic coating. The conductive material may extend over the entire length of the fiber, or just a portion thereof. Alternate embodiments may include moveable optical fiber 1125 having segmented electrodes and cavity 1120 having a conductive component at a common voltage.

Figure 12A:
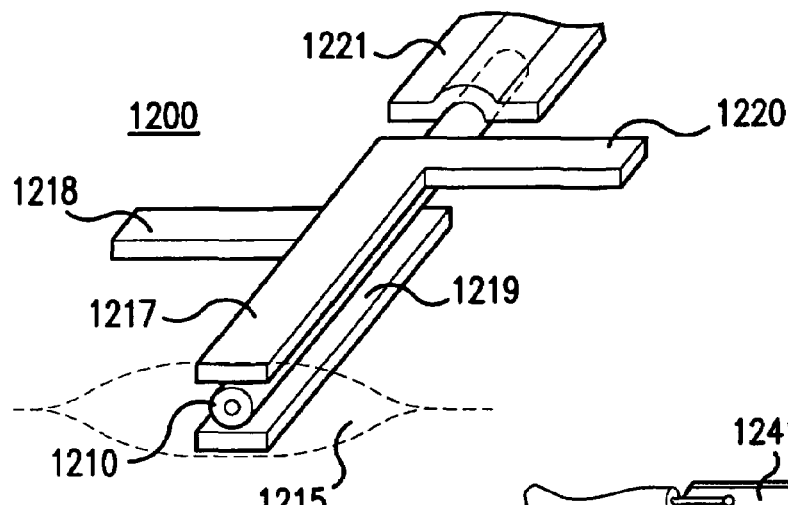
FIGS. 12A–B show in detail an exemplary optical switch consistent with another embodiment of the invention.
Figure 12B:
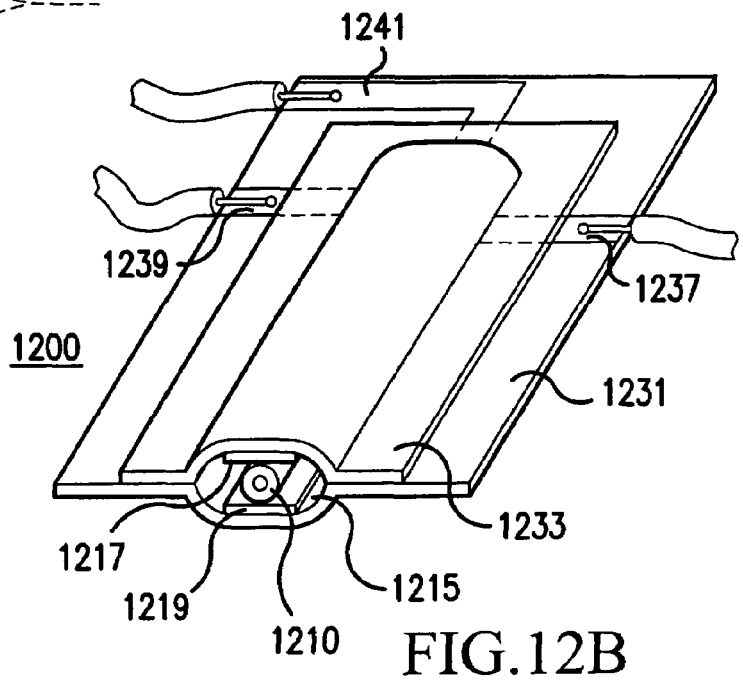

FIGS. 12A and 12B depict an exemplary optical switch 1200 having a fixture which may be fabricated from LTCC and is consistent with another embodiment of the invention. FIG. 12A depicts a view showing the interior of optical switch 1200. Moveable optical fiber 1210, which may be associated with a conductive component as described above and does not have any segmented electrodes formed on its surface, may be placed proximate to at least one electrode. The electrode can be formed from metalized lengths coupled to the interior of the LTCC fixture, and exposed to cavity 1215. While FIG. 12A shows two electrodes, upper electrode 1217 and lower electrode 1219, one of ordinary skill in the art would appreciate different numbers of electrodes may be used. As shown in FIG. 12A, each electrode 1217 and 1219 includes a diverging leg, 1218 and 1220, respectively, to provide a path away from the cavity for allowing a contact point for external conductors for providing voltage control signals. A third electrode 1221 may be attached to the fixed end of moveable optical fiber 1210 to provide a ground connection, and may also serve as a clasp to fix the fiber. When a control signal is applied to top electrode 1217, moveable optic fiber 1215 will be pulled upward, and when a control signal is applied to bottom electrode 1219, moveable optical fiber 1215 will be pulled downward. FIG. 12B depicts the exemplary optical switch 1200 showing the external fixture. The fixture may be formed from LTCC, or using any other appropriate laminating and/or ceramic technology known in the art. The fixture may be formed from a lower sheet 1231 and an upper sheet 1233. A portion of the interior of lower sheet 1231 and upper sheet 1233 may form walls of cavity 1215, which may surround moveable optical fiber 1210, upper electrode 1217 and lower electrode 1219. Both upper electrode 1217 and lower electrode 1219 may include contact pads 1237 and 1239, respectively. Each contact pad may connect to an external conductor which can provide separate control signals to electrodes 1217 and 1219 for affecting fiber movement. Alternately, each path may comprise part of a larger network within the fixture. Third electrode 1221 may also have a connector pad 1241 which allows the potential on the optical moveable fiber to be controlled.

Figure 13:
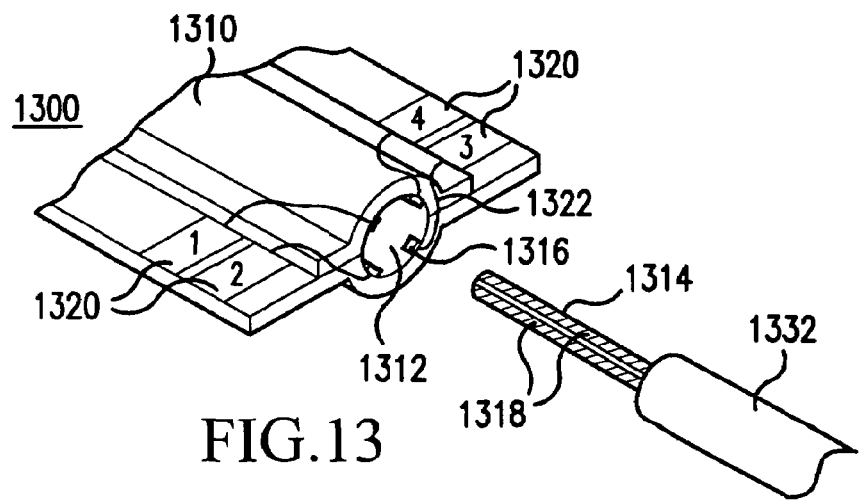
FIG. 13 shows in detail another exemplary optical switch consistent with yet another embodiment of the invention.

FIG. 13 depicts another exemplary optical switch 1300 which may have an LTCC fixture and is consistent with yet another embodiment of the invention. Optical switch 1300 includes a fixture 1310 that may be formed from LTCC, or using any other appropriate laminating and/or ceramic technology known in the art. Fixture 1310 may include a cavity 1312 which may be configured to receive a moveable optical fiber 1314. Moveable optical fiber 1314 may be removably coupled to fixture 1310, and held in place using friction and/or a snap-type fitting, or any other removable securing method known in the art. The interior of cavity 1312 may be associated with conductive material, and may be, for example, coated with a metallic material, and connected to ground using an external conductor (not shown). At the opening of cavity 1312, at least one contact 1316 may be provided to electrically connect control signal(s) to a corresponding electrode 1318 associated with moveable fiber 1314. Shown in FIG. 13 are four contacts, but of course one is not limited to this number. Contact(s) 1316 may be made with an insert which is coupled to fixture 1310 using conductive glue, solder, spring force, friction, etc. Each contact 1316 may be electrically coupled to a respective contact pad 1320 using a respective trace 1322 coupled to fixture 1310. Trace(s) 1322 may be fabricated using thick film trace technology, or any other known trace fabrication methods. External conductors may be coupled to contact pad(s) 1320 to provide control signals to the electrode(s) 1318 attached to moveable optical fiber 1314. The portion of the moveable optical fiber 1314 residing outside cavity 1312 after insertion may be covered with a protective sheath 1332.

FIGS. 14A–H illustrate stages of an exemplary laminated dielectric-based fabrication technique for an optical switch consistent with the embodiment shown in FIGS. 12A–B. Methods of fabrication may include those described in U.S. patent application Ser. No. 10/768,329, which is incorporated herein by reference. Methods consistent with embodiments of the invention may include the utilization of such laminated dielectric materials including, for example, LTCC material, high-temperature co-fired ceramic material (HTCC), printed circuit board material, or any such material know to those of ordinary skill in the art.

Figure 14A:
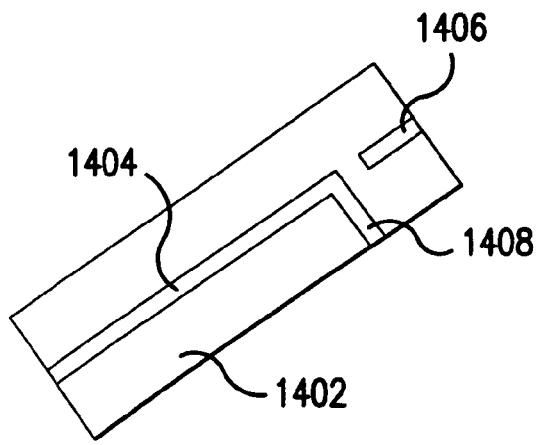
FIGS. 14A–G illustrate stages of an exemplary fabrication technique for an optical switch consistent with the embodiment shown in FIGS. 12A–B.

Referring to FIG. 14A, the fabrication process may initially start by providing a first blank tape 1402 as a substrate. First blank tape 1402 may have alignment holes and/or vias for vertical conductors. First blank tape 1402 can be an unfired ceramic composite which may be commercially available, such as, for example, GreenTape™ made by DuPont, or tapes sold by Ferro or others. First blank tape 1402 can be 2, 4.5, 6.5 or 10 mils thick, or may comprise multiple layers of blank tapes. Different thickness may be required depending upon the application and operating environment of the optical switch. Further referring to FIG. 14A, the next step is to apply traces for the formation of the bottom electrode 1404, clasp electrode 1406, and an external trace 1408 to connect the bottom electrode to an external conductor carrying a control signal. The traces may be applied to first blank tape 1402 using a thick film process, which may include screen printing, direct writing, using an ink pen machine, stencils, sprayed processes, etc.

Figure 14B:
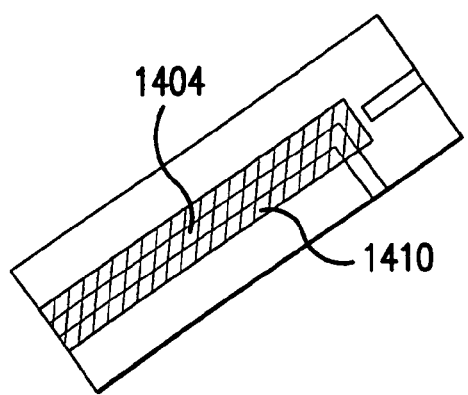

Referring to FIG. 14B, the next step in the process is to apply a first sacrificial volume material (SVM) over the bottom electrode 1404. SVM may be carbon tape (e.g., 2, 8, or 10 mil tapes manufactured by Harmonics, Inc), carbon pastes (e.g., manufactured by Harmonics, Inc), setter tapes with an inert filler (1, 3, or 10 mil manufactured by Harmonics, Inc.), low molecular weight plastic sheets, etc. The SVM may also be manufactured form one or more materials selected from the group consisting of a wax, carbon, graphite, a carbon tape, a carbon-filled slurry, a porous graphite, a plasticizer, an organic binder, a plastic, a polymer, a water-soluble material, a starch, a sugar, corn starch, a material soluble in an organic solvent, a photoresist, an acrylic latex in a colloidal suspension, metal oxide particles in an organic binder, polypropylene, a photo patternable material, a polyester, a polyethylene, and a polyvinyldine dichloride.

Figure 14C:
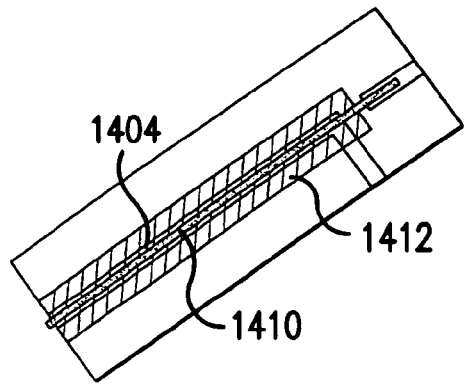

Referring to FIG. 14C, a fiber 1412, having a conductive material associated therewith (e.g., having a metallic coating or conductive polymer buffer), may be placed over SVM 1410 directly over bottom electrode 1404 and clasp electrode 1406.

Figure 14D:
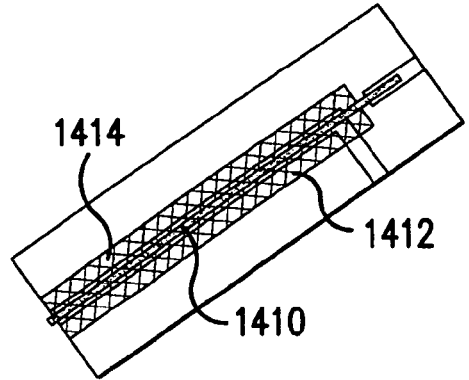

Referring to FIG. 14D, a second SVM 1414 may be placed over fiber 1412 and may be substantially aligned with first SVM 1410. Second SVM 1414 may be similar or the same as SVM 1410.

Figure 14E:
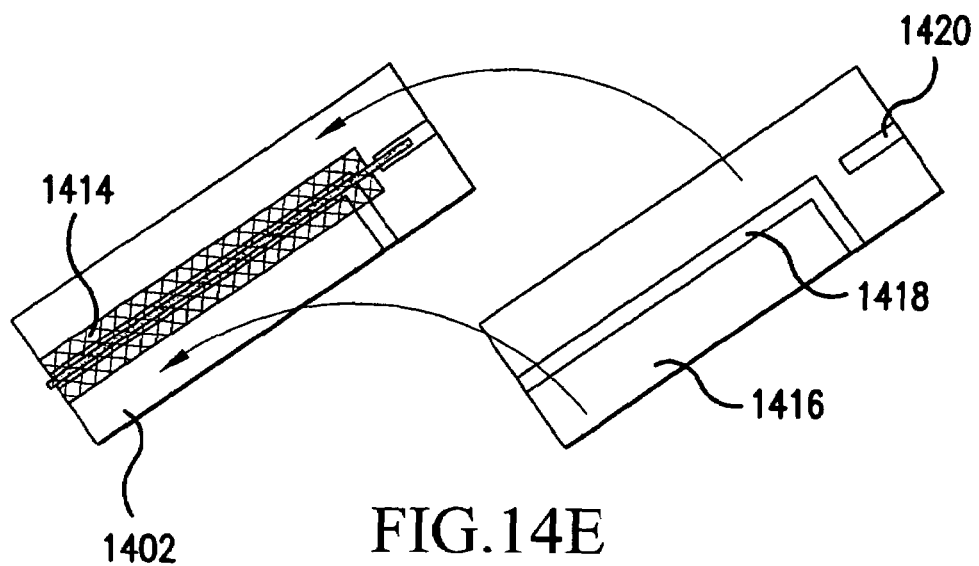

As shown in FIG. 14E, second blank tape 1416 may have upper electrode 1418 and clasp electrode 1420 applied using processes set forth above for the description of FIG. 14A. Second blank tape 1416 may then be stacked over first blank tape 1402 so that upper electrode 1418 is substantially aligned with lower electrode 1402 and optical fiber 1410. The stacking process may be referred to as collating.

Figure 14F:
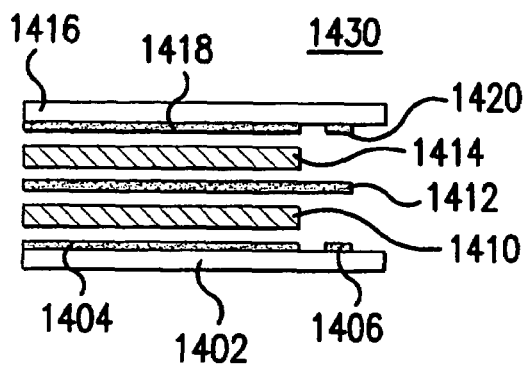

FIG. 14F shows a side view of a collated assembly 1430 prior to lamination and firing. Collated assembly 1430 may be then laminated by placing it in a vacuum bag, and then subjecting the bagged collated assembly 1430 to pressure at a set temperature (such as, for example, 3000 psi at approx. 70 deg C.). Other methods of lamination known in the art may also be used, for example, 30000 psi at room without the addition of heat.

Figure 14G:
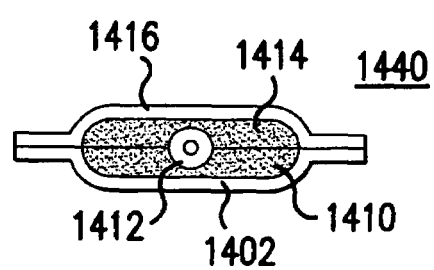

Referring to FIG. 14G, the laminated assembly 1440 may then be subjected to a plurality of stages of heat. One of the stages may be designed to burn out polymeric vehicles in the tape and thick films and SVM, as well as first SVM 1410 and second SVM 1414, so that a cavity is left from the SVM's absence. When the SVM is carbon, the burn out may be clean; however, when using other materials for the SVM, residue may have to be removed from the cavity. The burnout temperature may be, for example, approximately 450 deg C. Alternatively, an additional intermediate burnout temperature may be employed. Another stage of heat may be applied to laminated assembly 1440 to harden the blank tape 1402 and 1416 into fired ceramic. This stage of heat may use, for example, 850 deg. C. for 45 minutes. Any heat profile known by one of ordinary skill in the art may be used to accomplish the burn out and firing process. Additional methods of removing the sacrificial material may include one or more of dissolving, melting, powdering, heating, baking, firing, evaporating, sublimating, pyrolysis, disassociating, burning, oxidizing, reducing, dissolving, melting, powdering, pouring out, picking out pulling out and peeling off.

Other embodiments of the invention will be apparent to those skilled in the art from consideration of the specification and practice of the invention disclosed herein. As an example, an insert of metal could be used during lamination and removed prior to firing. It is intended that the specification and examples be considered as exemplary only, with a true scope and spirit of the invention being indicated by the following claims.

What is claimed is:

1. A method for producing an optical switch, comprising:
   providing a first substrate of deformable dielectric material;
   applying a first electrode upon the first substrate;
   depositing a first sacrificial material layer within an area designating a cavity over the first electrode;
   placing an optical fiber along the first substrate and on top of the first sacrificial material layer;
   depositing a second sacrificial material over the optical fiber and first sacrificial material;
   placing a second substrate of deformable dielectric material over the second sacrificial material to produce an assembly;
   laminating the assembly; and
   heating the assembly to remove the first and second sacrificial material.

2. The method of claim 1, wherein the deformable dielectric material comprises low-temperature co-fired ceramic and further comprises heating the assembly to alter the deformable dielectric material of the first and second substrates.

3. The method of claim 2, wherein the deformable dielectric material comprises blank tape material.

4. The method of claim 1, wherein the sacrificial material comprises carbon tape, setter tapes with an inert filler or low molecular weight plastic sheets, one or more materials selected from the group consisting of a wax, carbon, graphite, a carbon tape, a carbon-filled slurry, a porous graphite, a plasticizer, an organic binder, a plastic, a polymer, a water-soluble material, a starch, a sugar, corn starch, a material soluble in an organic solvent, a photoresist, an acrylic latex in a colloidal suspension, metal oxide particles in an organic binder, polypropylene, a photo patternable material, a polyester, a polyethylene, and a polyvinyldine dichloride.

5. The method of claim 1, wherein removing the sacrificial material further comprises at least one of dissolving, melting, powdering, heating, baking, firing, evaporating, sublimating, pyrolysis, disassociating, burning, oxidizing, reducing, dissolving, melting, powdering, pouring out, picking out pulling out and peeling off.

* * * * *